United States Patent Office 3,806,517
Patented Apr. 23, 1974

3,806,517
PREPARATION OF 4,5-DICYANOIMIDAZOLES
Robert Walter Begland, Wilmington, Del., assignor to
E. I. du Pont de Nemours and Company, Wilmington, Del.
No Drawing. Filed Feb. 25, 1972, Ser. No. 229,556
Int. Cl. C07d 49/36
U.S. Cl. 260—309          8 Claims

ABSTRACT OF THE DISCLOSURE 4,5-dicyanoimidazoles are obtained by heating at 120–170° a 2 - amino - 3-(N,N-disubstitutedaminomethyleneamino)maleonitrile or its precursors. The dicyanoimidazoles can be converted to purine alkaloids such as caffeine or related xanthines.

BACKGROUND OF THE INVENTION

Field of the invention

This invention relates to a novel and facile process for the preparation of 4,5-dicyanoimidazoles that may optionally have a substituent on the 2 carbon atom.

Description of the prior art

Purines have been synthesized in various ways. A recent method of Clark and Lister, J. Chem. Soc. (C) 5048–5050 (1961) involves the reaction of 4,5-diamino pyrimidine that has chlorine in the pyrimidine ring with phosphoryl chloride and dimethylformamide at temperatures below 100° C.

Description of the invention

The process of this invention involves the preparation of a 4,5-dicyanoimidazole,

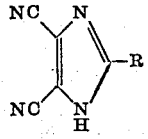

which consists essentially in the step of reacting a compound selected from the group consisting of HCN and diaminomaleonitrile with an amide of the formula

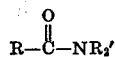

wherein
R is hydrogen, saturated hydrocarbyl radical, halo-, nitro-, alkoxy-, or carboalkoxy- substituted hydrocarbyl radical, of up to 8 carbon atoms;
R' is saturated lower alkyl of up to 4 carbon atoms;

in the presence of a condensing agent selected from the group phosphorus oxychloride, phosphorus oxybromide, phosphorus trichloride, phosphorus pentachloride, phosgene, thionyl chloride and formic acid and heating the reactants in the range of 129–170° C. to produce the 4,5-dicyanoimidazole, with the proviso that when HCN is selected, its tertamerization to diaminomaleonitrile (DAMN) is first carried out in the presence of a catalytic amount of a basic catalyst at a temperature range of 0 to 100° C., which is then followed by condensation with the amide as set out above.

Below 120° C. or above 170° C. the yields decrease. The preferred temperature range is 150–160° C.
The reaction using HCN is represented by the equation:

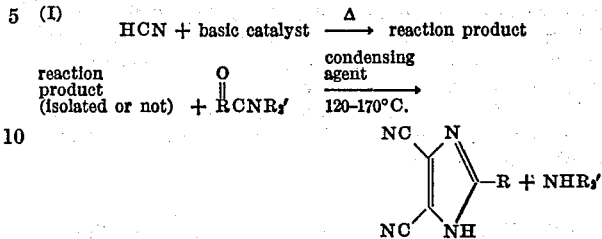

The basic catalyst for the tetramerization to diaminomaleonitrile can be either soluble or insoluble. Such inorganic compounds as potassium and sodium cyanides as well as other alkaline cyanides are useful. Also useful are amines, pyridine, powdered soft glass, basic ion-exchange resins, sodium, potassium and other metal hydroxides, calcium, barium and magnesium oxides, basic alumina, sodium carbonate, potassium carbonate, sodium bicarbonate, potassium bicarbonate, etc. The catalysts are those that have utility in the well-known cyanohydrin reaction. They are basic, i.e., exhibit a pH of over 7 in aqueous media. When ion-exchange resins are used in the latter test, the water should contain sodium chloride (or a similar salt). Although a temperature range of 0 to 100° C. can be used, generally 0–20° C. is preferred. A solvent, preferably an amide as hereinafter defined is preferably present.

The reaction using diaminomaleonitrile is represented by the aquation:

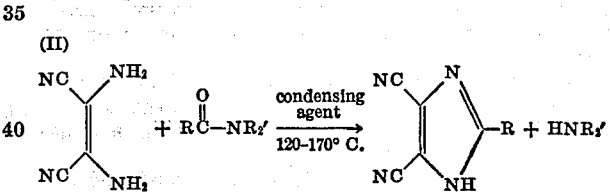

In addition to the above, the 4,5-dicyanoimidazole can be prepared by the method which involves the use of an adduct formed from diaminomaleonitrile and the amide in the presence of the condensing agent at a lower temperature and then heating such adduct alone at 120–170° C. The reactions involved are:

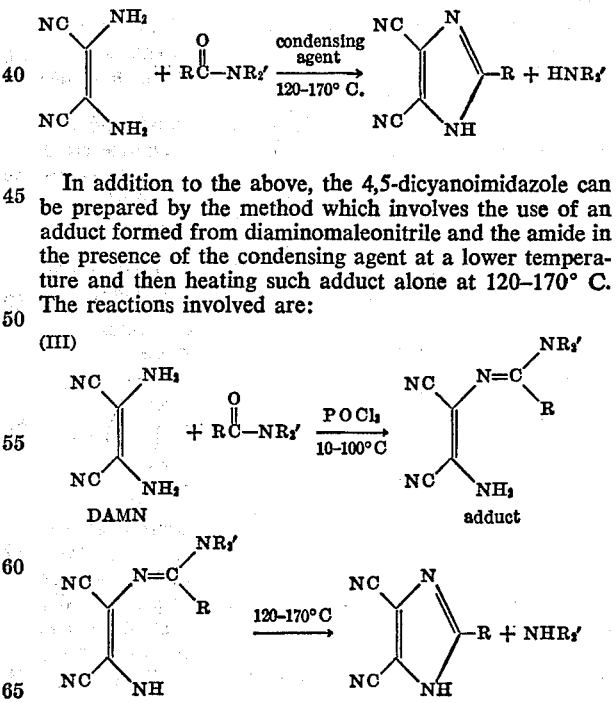

The adduct, N,N-disubstituted aminomethyleneamino maleonitrile, is prepared by the reaction of diaminomaleonitrile with an amide, $$R\overset{O}{\underset{\|}{C}}-NR_2'$$

(wherein R is as previously defined and R' is selected from saturated lower alkyl radicals, particularly 1-4 carbon alkyls, in the presence of POCl$_3$, POBr$_3$, PCl$_3$, PCl$_5$, COCl$_2$, SOCl$_2$ or HCO$_2$H (phosphorus oxychloride, phosphorus oxybromide, phosphorus trichloride, phosphorus pentachloride, phosgene, thionyl chloride or formic acid, respectively) at a temperature of below about 100° C. and preferably in the range 10–50° C. The preferred condensing agent is POCl$_3$ and the best yields are obtained when about 0.4 mole of POCl$_3$ is used with 1 mole of diaminomaleonitrile. The amount of condensing agent is preferably between about 0.33 mole to 2 moles or more per mole of diaminomaleonitrile.

The amides that can be used include dimethylformamide, dimethylacetamide, N,N-diethylacetamide, N,N-dimethylisobutyramide,

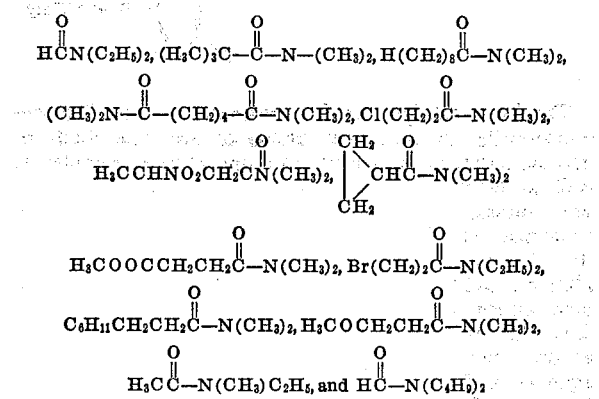

Amides such as the above can serve as solvents or diluents and can be employed in the heating operation to produce the imidazole since they boil above about 150° C. These amides have hydrocarbyl substituents or substitution products which are inert to the condensing agent. Solvents such as tetrahydrofuran or acetonitrile can be present in the condensation reaction but for the ring closure, a pressure container should be employed to obtain the preferred temperature.

The amide is present in at least a 1 to 1 molar ratio of the diaminomaleonitrile and generally is employed in amounts of 1 to 10 or more moles per mole of diaminomaleonitrile.

Diaminomaleonitrile is a known compound and can be prepared from HCN and an alkali metal cyanide using a solvent such as dimethylformamide generally at below about 20°, as described in Webster, U.S. 3,564,039.

SPECIFIC EMBODIMENTS OF THE INVENTION

In the following illustrative examples all parts and percentages are by weight unless otherwise stated.

Example 1.—4,5-dicyanoimidazole from diaminomaleonitrile and dimethylformamide

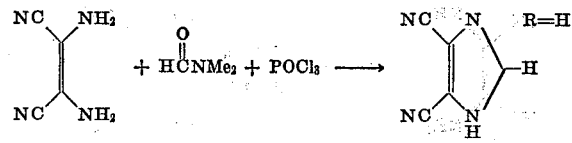

A solution of 10.8 g. (0.10 mole) of diaminomaleonitrile (DAMN) in 75 ml. of dimethylformamide (DMF) was cooled in an ice bath and 10.0 g. (0.065 mole) of POCl$_3$ was added dropwise so that the temperature did not go above 10° C. After addition the solution was heated to 160° over 1 hr., then at 100° and most of the solvent was removed under vacuum. Water (100 ml.) was added, the solution was warmed to 70°, filtered and the filtrate was extracted with 9× 200 ml. of ether. The combined ether extracts were dried over MgSO$_4$ and the ether was removed to give 10.7 g. (90.6%) of 4,5-dicyanoimidazole.

Example 2.—4,5-dicyanoimidazole from DAMN-DMF adduct [2-amino - 3 - (N,N-dimethylaminomethyleneamino)maleonitrile]

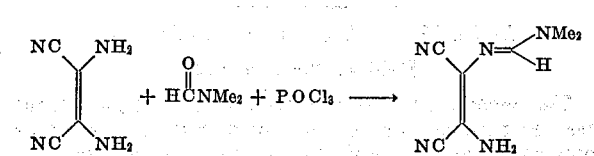

A solution of 3.5 g. (0.021 mole) of 2-amino-3-(N,N-dimethylaminomethyleneamino)maleonitrile in 20 ml. of DMF was heated to 160° over 0.5 hr., held there for 0.5 hr., cooled to 80° and the solvent was removed under vacuum. Water (100 ml.) was added and the resulting solution was extracted with 3× 100 ml. of ether. Removal of the ether gave 1.1 g. (44%) of 4,5-dicyanoimidazole, M.P. 174–175° C.

2 - amino - 3(N,N - dimethylaminomethyleneamino)-maleonitrile was prepared as follows:

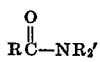

A solution of 10.8 g. (0.10 mole) of diaminomaleonitrile (DAMN) in 100 ml. of dimethylformamide (DMF) was cooled to 5° C. and about 10 g. of POCl$_3$ was added dropwise at a rate such that the reaction temperature did not go above 10° C. After the addition was complete the cold solution was poured into 300 ml. of water and the resulting solution was neutralized with conc. NH$_4$OH. The precipitate was collected and recrystallized from benzene to give 9.7 g. (60%) of product as light yellow crystals, M.P. 152–154°.

Analysis.—Calcd. for C$_7$H$_9$N$_5$ (percent): C, 51.6; H, 5.5; N, 43.0. Found (percent): C, 51.0; H, 5.5; N, 43.0.

IR (Nujol) 3450, 3310, 2210, 2200, 1640, 1600 cm.$^{-1}$

NMR (DMSO-d$_6$/TMS) δ=2.95 and 3.08, broad singlet, 6H; δ=5.83; broad, 2H; δ 7.59, singlet, 1H.

Example 3.—2-methyl-4,5-dicyanoimidazole from diaminomaleonitrile and dimethylacetamide

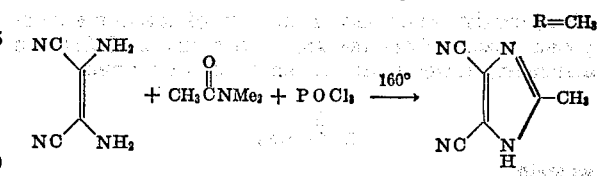

To a solution of 5.4 g. (0.05 mole) of diaminomaleonitrile in 40 ml. of dimethylacetamide was added 3.0 g. (0.02 mole) of POCl$_3$ at a rate such that the temperature did not go above 40° C. The resulting solution was then heated to 160° C. over 0.5 hr., cooled to approximately 100° C. and the solvent was removed under vacuum. Water (200 ml.) was added to the resulting solid, the solution was heated to 90° C. and filtered. Upon cooling 3.0 g. of the 2-methyl-4,5-dicyanoimidazole precipitated from the solution. Extraction with ether (3× 200 ml.) gave another 2.9 g. of product, 89% total yield. Recrystallization from water gave colorless needles, M.P. 228–230° C.

When the above procedure was repeated except the maximum temperature was 120° C., only a 20% yield was obtained.

An intermediate adduct of dimethylacetamide with diaminomaleonitrile, i.e., 2-amino-3-(N,N-dimethylaminoethylideneamino)maleonitrile, was obtained as follows:

To a solution of 4.0 g. (0.037 mole) of diaminomaleonitrile (DAMN) in 30 ml. of dimethylacetamide at 10° C. was added dropwise over 10 min. 4.8 g. (0.031 mole) of phosphorous oxychloride ($POCl_3$). The temperature rose to 30° C. and the solution became thick with precipitate. After ½ hour 400 ml. of cold water was added and the resulting solution was neutralized with conc. ammonium hydroxide. The precipitated product was collected, dissolved in 150 ml. of chloroform, dried over anhydrous $MgSO_4$ and the solvent was removed to give 3.5 g. (54%) of adduct. Recrystallization from benzene gave white needles, M.P. 110–112°.

*Analysis.*—Calcd. for $C_8H_{11}N_5$ (percent): C, 54.22; H, 6.26; N, 39.52. Found (percent): C, 54.45; H, 6.33; N, 39.74.

IR (Nujol): 3400, 3300, 2205, 2195 and 1565 cm.$^{-1}$
NMR ($CDCl_3$/TMS) $\delta=2.15$, singlet, 3H; $\delta=3.05$, singlet, 6H; $\delta=4.4$, broad, 2H.

Heating this adduct at about 160° C. with DMF as described in Example 2 also gives 2-methyl-4,5-dicyanoimidazole.

Example 4.—2-methyl-4,5-dicyanoimidazole

2-methyl-4,5-dicyanoimidazole can be prepared by heating the adduct of diaminomaleonitrile with N,N-diethylacetamide at about 160° as described in the prior example.

The 2 - amino - 3(N,N-diethylaminoethylideneamino)maleonitrile was obtained as follows:

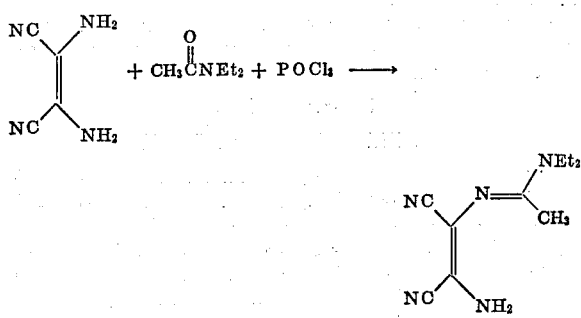

To a solution of 10.8 g. (0.10 mole) of diaminomaleonitrile in 70 ml. of N,N-diethylacetamide was added 10 ml. (~.1 mole) of $POCl_3$ over 10 min. The temperature rose to 50° during addition. The resulting solution was cooled, poured into 200 ml. of water and neutralized with conc. $NH_4OH$. An oil separated which was taken up in ethyl acetate, dried and the solvent removed to give a light yellow oil. Anhydrous HCl was added to an ether solution of this oil and a white precipitate formed. Recrystallization from methanol-ether gave 13.8 g. (57%) of adduct as the HCl salt, M.P. 185–186°.

*Analysis.*—Calcd. for $C_{10}H_{16}N_5Cl$ (percent): C, 49.69; H, 6.67; N, 28.97; Cl, 14.67. Found (percent): C, 49.40; H, 6.67; N, 28.65; Cl, 14.94.

IR (Nujol) 3600, 3360, 2240, 1640, 1600 cm.$^{-1}$.
NMR (DMSO-$d_6$) $\delta=1.1$, broad triplet, 6H; $\delta=2.20$, singlet, 3H; $\delta=3.6$, broad peak, 4H; $\delta=8.4$, broad, 2H.

Example 5.—2-isopropyl-4,5-dicyanoimidazole

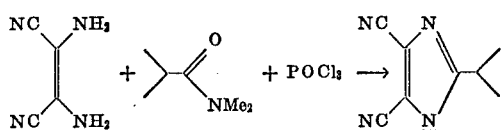

To a solution of 5.0 g. (0.046 mole) of diaminomaleonitrile in 50 ml. of N,N-dimethylisobutyramide was added 10 ml. (~.1 mole) of $POCl_3$ in several portions. The reaction temperature rose to 65° C. over 15 min. and some precipitate formed but redissolved upon further stirring. Over 0.5 hr. the resulting solution was heated to 120° C., cooled, 400 ml. of water was added and the resulting solution was extracted with 2× 200 ml. of ether. The ether extracts were dried over $MgSO_4$ and the ether was removed to give 2.2 g. (30%) of 2-isopropyl-4,5-dicyanoimidazole, M.P. 154–156° C.

Example 6.—4,5-dicyanoimidazole from HCN

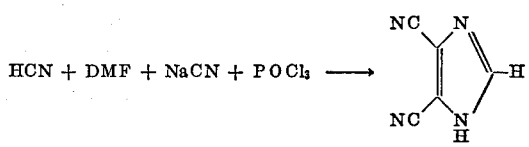

To a slurry of 3.0 g. of sodium cyanide in 100 ml. of DMF was added 39 g. of HCN in portions. The reaction temperature went from 25° to 36° during addition. The resulting solution was stirred for 15 min. at 30° and then heated to 80° over 15 min. At approx. 80° an exothermic reaction occurred and the pot temperature remained between 80° and 84° C. for 30 min. without external heat. The HCN was kept in the flask during this time by a cold finger condenser at −15° C. The cold finger was a glass test tube containing a refrigerant such as a mixture of Dry Ice and acetone.

The resulting dark solution was diluted with 100 ml. of DMF, cooled to 5° C. and 17 g. (0.11 mole) of $POCl_3$ was added dropwise over 20 min. The solution was then heated to 157° C. over 1.5 hr., the solvent was removed under vacuum, 300 ml. of water was added and the aqueous slurry was heated to 80° C. and filtered. Extraction with 5× 300 ml. of ether gave 11.0 g. (26%) of 4,5-dicyanoimidazole.

Example 7.—4,5-dicyanoimidazole using $SOCl_2$

From 10.8 g. of diaminomaleonitrile and 6.0 g. of $SOCl_2$ reacted in dimethylformamide and worked up as in Example 1 there was obtained 2.4 g. (20%) of 4,5-dicyanoimidazole.

Example 8.—4,5-dicyanoimidazole using formic acid

From 10.8 g. (0.10 mole) of diaminomaleonitrile, 6.9 g. (0.15 mole) of formic acid and 75 ml. of dimethylformamide there was obtained 5.5 g. (46%) of 4,5-dicyanoimidazole. This reaction was run in a manner similar to those using $POCl_3$.

Example 9.—4,5-dicyanoimidazole and 4-cyano-5-imidazolecarboxamide

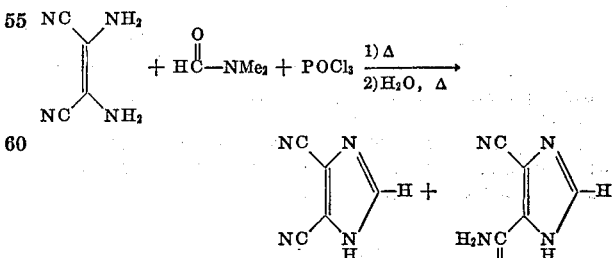

The general reaction of Example 1 was repeated with 5.40 g. of diaminomaleonitrile and 3.1 g. of $POCl_3$ except that when the water (50 ml.) was added, the solution was heated to reflux, filtered and cooled in an ice bath. A tan precipitate formed and was collected. Extraction of the filtrate with 2× 200 ml. of ether gave a little solid. The solids were combined and washed with 2×100 ml. of ethyl acetate. Tan crystals (1.53 g., 22%) of 4-cyano-5-imidazolecarboxamide, M.P. 274–275° did not dissolve in the ethyl acetate. Removal of the ethyl acetate gave 4.6 g. (78%) of dicyanoimidazole.

Example 10.—4,5-dicyanoimidazole

Phosgene (4.0 ml., ~.05 mole) was slowly bubbled into a solution of 5.4 g. (0.05 mole) of DAMN in 35 ml. of DMF. The reaction temperature was maintained at 10–15° C. during addition by means of an ice bath. After COCl₂ addition the reaction solution was warmed to room temperature and then heated over 30 min. to 155° C. The resulting dark solution was cooled to 70° C., the solvent was removed under reduced pressure and 200 ml. of water was added. This aqueous solution was filtered to remove polymeric solids and the water was extracted with ether to give 2.0 g. of yellow powder which by IR contained approximately equal amounts of 4,5-dicyanoimidazole (16%) and 4,5-dicyano-2-imidazolone.

Example 11.—4,5-dicyanoimidazole

To a solution of 5.4 g. (0.05 mole) of DAMN in 35 ml. of DMF at 5° was added in portions 8.0 g. (0.038 mole) of phosphorous pentachloride. The resulting solution was allowed to warm slowly and at 20° C. the entire reaction mixture turned solid. The reaction was then heated to 155° C. over ½ hr. (at ~60° C. the solid was all back in solution). The DMF was removed under vacuum, 200 ml. of water was added and this dark aqueous solution was extracted with 2× 300 ml. of ether to give 1.6 g. (25%) of 4,5-dicyanoimidazole.

The imidazoles obtainable by the above process are useful for the preparation of purine and substituted purines and particularly xanthine alkaloids. The latter include theobromine, theophylline and caffeine and have medicinal and/or beverage uses. 4,5-dicyanoimidazoles can be readily converted to xanthines, e.g., hydrolysis of the dicyano groups gives the diamine in high yield. The latter on treatment with sodium hypochloride gives xanthine which upon complete methylation yields the dimethylxanthine as shown below (wherein caffeine is obtained when R is H):

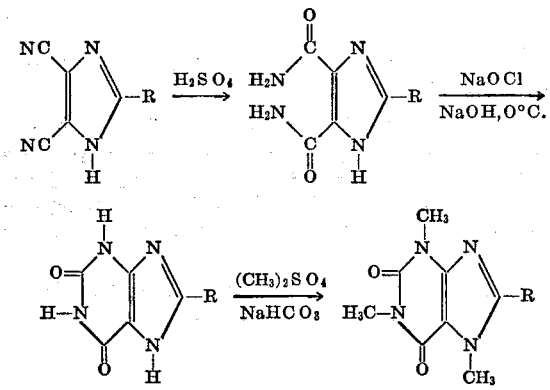

The embodiments of the invention in which an exclusive property or privilege is claimed are defined as follows:

1. A process of preparing a 4,5-dicyanoimidazole which consists essentially in the step of reacting diaminomaleonitrile with an amide of the formula

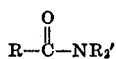

wherein

R is hydrogen, saturated hydrocarbyl radical of up to 8 carbon atoms or halo-, nitro-, alkoxy-, or carboalkoxy-substituted hydrocarbyl radical, each of up to 8 carbon atoms;

R' is lower alkyl of up to 4 carbon atoms; in the presence of a condensing agent selected from the group phosphorus oxychloride, phosphorus oxybromide, phosphorus trichloride, phosphorus pentachloride, phosgene, thionyl chloride and formic acid and heating the reactants in the range of 120–170° C. to produce the 4,5-dicyanoimidazole.

2. The process of claim 1 wherein dimethylformamide is used.

3. The process of claim 1 wherein dimethylacetamide is used.

4. The process of claim 1 wherein N,N-diethylacetamide is used.

5. The process of claim 1 wherein N,N-dimethylisobutyramide is used.

6. A process of preparing a 4,5-dicyanoimidazole which consists essentially in the step of heating at 120–170° C. a compound of the formula

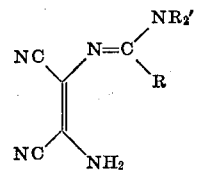

wherein

R is hydrogen, saturated hydrocarbyl radical of up to 8 carbon atoms or halo-, nitro-, alkoxy-, or carboalkoxy-substituted hydrocarbyl radical, each of up to 8 carbon atoms and R' is lower alkyl of up to 4 carbon atoms.

7. The process of claim 6 wherein the compound which is heated is 2-amino-3-(N,N-dimethylaminomethyleneamido)maleonitrile.

8. The process of claim 6 wherein the compound which is heated is 2-amino-3-(N,N - diethylaminoethylideneamino)-maleonitrile.

References Cited

UNITED STATES PATENTS

| | | | |
|---|---|---|---|
| 3,073,851 | 1/1963 | Steiger | 260—564 R |
| 3,153,033 | 10/1964 | Steiger | 260—564 R |
| 2,848,438 | 8/1958 | Gluesenkamp | 260—465 R |
| 2,155,878 | 4/1939 | Waldmann et al. | 260—309.6 |
| 2,267,965 | 12/1941 | Wilson | 260—309.6 |
| 2,355,837 | 8/1944 | Wilson | 260—309.6 |
| 2,778,836 | 1/1957 | Morren | 260—309.6 |
| 3,177,223 | 4/1965 | Erner | 260—309 |
| 2,534,331 | 12/1950 | Woodward | 260—309 |
| 3,709,900 | 1/1973 | Hartter | 260—309 |
| 3,564,039 | 2/1971 | Webster | 260—465.5 |

FOREIGN PATENTS 1,207,475  10/1970  Great Britain _____ 260—309

OTHER REFERENCES

Shriner et al.: Chem. Rev., vol. 33, p. 362 relied on (1944).

Hill et al.: J. Amer. Chem. Soc., vol. 48, pp. 732–737 (1926).

Katritzky et al.: Advances in Heterocyclic Chemistry, vol. 12, pp. 129–30 relied on (1970).

NATALIE TROUSOF, Primary Examiner

U.S. Cl. X. R.

260—256.4 F, 465.5 R, 564 R